(12) United States Patent
Miao et al.

(10) Patent No.: US 12,426,032 B2
(45) Date of Patent: Sep. 23, 2025

(54) SCHEDULING REQUEST TRANSMITTING METHOD AND TERMINAL

(71) Applicant: DATANG MOBILE COMMUNICATIONS EQUIPMENT CO., LTD., Beijing (CN)

(72) Inventors: Jinhua Miao, Beijing (CN); Li Chen, Beijing (CN); Pierre Bertrand, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 358 days.

(21) Appl. No.: 17/999,612

(22) PCT Filed: Jun. 4, 2021

(86) PCT No.: PCT/CN2021/098293
§ 371 (c)(1),
(2) Date: Nov. 22, 2022

(87) PCT Pub. No.: WO2021/244633
PCT Pub. Date: Dec. 9, 2021

(65) Prior Publication Data
US 2023/0199748 A1    Jun. 22, 2023

(30) Foreign Application Priority Data
Jun. 4, 2020   (CN) .......................... 202010501940.4

(51) Int. Cl.
H04W 72/12    (2023.01)
H04W 72/20    (2023.01)

(52) U.S. Cl.
CPC ........... *H04W 72/12* (2013.01); *H04W 72/20* (2023.01)

(58) Field of Classification Search
None
See application file for complete search history.

(56) References Cited

U.S. PATENT DOCUMENTS

| | | | |
|---|---|---|---|
| 2018/0124831 A1* | 5/2018 | Dinan | .................... H04W 76/15 |
| 2019/0215888 A1 | 7/2019 | Cirik et al. | |
| 2020/0084790 A1 | 3/2020 | Wang et al. | |
| 2021/0153074 A1 | 5/2021 | Yang et al. | |
| 2021/0153091 A1* | 5/2021 | Hosseini | ............... H04W 36/16 |
| 2021/0218462 A1 | 7/2021 | Shi et al. | |

(Continued)

FOREIGN PATENT DOCUMENTS

| | | |
|---|---|---|
| CN | 109156026 A | 1/2019 |
| CN | 109392118 A | 2/2019 |

(Continued)

OTHER PUBLICATIONS

Huawei et al., R2-1710110, "SR failure handling in NR", 3GPP TSG-RAN2 Meeting #99bis, Oct. 9, 2017 (Year: 2017).*

(Continued)

*Primary Examiner* — Clemence S Han
(74) *Attorney, Agent, or Firm* — Harness, Dickey & Pierce, P.L.C.

(57) ABSTRACT

This disclosure provides a scheduling request (SR) transmitting method and a terminal. The method includes: switching to a second resource in a case that an SR fails to be transmitted at a first resource; and transmitting the SR at the second resource.

16 Claims, 2 Drawing Sheets switching to a second resource in a case that an SR fails to be transmitted at a first resource — 201 transmitting the SR at the second resource — 202

(56) References Cited

U.S. PATENT DOCUMENTS

| | | | |
|---|---|---|---|
| 2021/0314992 A1 | 10/2021 | Jiang | |
| 2021/0321461 A1* | 10/2021 | Kung | H04W 74/0833 |
| 2021/0352717 A1* | 11/2021 | Lee | H04W 74/0808 |
| 2021/0368545 A1 | 11/2021 | Xu et al. | |
| 2022/0015117 A1 | 1/2022 | Miao et al. | |
| 2022/0078768 A1* | 3/2022 | El Hamss | H04L 5/0055 |
| 2022/0109486 A1* | 4/2022 | Fu | H04L 5/0044 |
| 2022/0110153 A1* | 4/2022 | Wu | H04W 74/0808 |
| 2022/0304076 A1* | 9/2022 | Wang | H04W 74/0841 |

FOREIGN PATENT DOCUMENTS

| | | |
|---|---|---|
| CN | 109788574 A | 5/2019 |
| CN | 110798864 A | 2/2020 |
| CN | 110798896 A | 2/2020 |
| CN | 110972143 A | 4/2020 |
| CN | 111107655 A | 5/2020 |
| CN | 111163518 A | 5/2020 |
| WO | WO-2020/024832 A1 | 2/2020 |

OTHER PUBLICATIONS

Ericsson, R2-1708197, "SR failure handling", 3GPP TSG-RAN WG2 #99, Aug. 21, 2017 (Year: 2017).*
Vivo, R2-1710974, "Discussion on the SR cancellation and failure handling", 3GPP TSG-RAN WG2 Meeting #99bis, Oct. 9, 2017 (Year: 2017).*
Ericsson, R2-1711179, "SR failure handling for multiple pending SRs", 3GPP TSG-RAN WG2 #99bis, Oct. 9, 2017 (Year: 2017).*
Ericsson, R2-1713481, "Further enhancement to the SR failure handling for multiple pending SRs", 3GPP TSG-RAN WG2 #100, Nov. 27, 2017 (Year: 2017).*
International Search Report/Written Opinion issued Aug. 27, 2021 in International Application No. PCT/CN2021/098293.
Lenovo, "Discussion of multi-beam operation," 3GPP TSG RAN WG1 #96bis, R1-19004573 Mar. 29, 2019.
Notification of the First Office Action issued Jun. 1, 2023 in Chinese Application No. 202010501940.4.
Extended European Search Report issued Sep. 18, 2023 in European Application No. 21817166.8.

* cited by examiner

SCHEDULING REQUEST TRANSMITTING METHOD AND TERMINAL

CROSS-REFERENCE TO RELATED APPLICATIONS

This application is a U.S. national phase application of a PCT Application No. PCT/CN2021/098293 filed on Jun. 4, 2021, which claims a priority to the Chinese patent application No. 202010501940.4 filed in China on Jun. 4, 2020, the disclosures of which are incorporated herein by reference in their entireties.

TECHNICAL FIELD

The present disclosure relates to the field of communication technology, in particular to a scheduling request (SR) transmitting method and a terminal.

BACKGROUND

Sometimes a terminal may not have uplink data to transmit, hence, there is no need for the network side to allocate uplink resources to the terminal at these occasions; otherwise the resources will be wasted. As a result, some communication systems (such as New Radio (NR) systems) provide an uplink scheduling request (SR) mechanism, in which the terminal transmits an SR to the network side to request resource scheduling, such that the network side may allocate uplink resources for the terminal. However, in practice, the terminal may not be able to transmit the SR according to an SR configuration, and therefore the terminal has to wait, and subsequently resumes transmitting the SR in an original BWP in an original serving cell according to the original SR configuration, thereby resulting in a large latency for the terminal in requesting uplink resources.

SUMMARY

The present disclosure provides an SR transmitting method and a terminal, so as to solve the problem of large latency for a terminal in requesting uplink resources.

The present disclosure provides in some embodiments an SR transmitting method, performed by a terminal, including: switching to a second resource in a case that an SR fails to be transmitted at a first resource; and transmitting the SR at the second resource.

Optionally, the second resource includes: a target serving cell or a target bandwidth part (BWP) or a first SR configuration.

Optionally, the target serving cell includes any one of: a serving cell pre-configured by a network side, a serving cell selected by the terminal in accordance with a measurement result, a serving cell dynamically indicated by the network side, a serving cell in licensed spectrum, a special cell (SpCell) initially accessed by the terminal when entering a connected state, or an SpCell initially accessed by the terminal when adding a secondary network node; wherein, in a case that the target serving cell is the SpCell, the terminal switches from a secondary cell (SCell) to the SpCell.

Optionally, the target BWP includes any one of: a BWP pre-configured by a network side, a BWP selected by the terminal in accordance with a measurement result, a BWP dynamically indicated by the network side, a BWP in licensed spectrum, an initial BWP, or a default BWP.

Optionally, the first SR configuration includes: an SR configuration pre-configured by a network side or an SR configuration dynamically indicated by the network side.

Optionally, the transmitting the SR at the second resource includes: transmitting the SR in the target serving cell according to a second SR configuration; or, transmitting the SR in the target BWP according to a third SR configuration.

Optionally, the second SR configuration is an SR configuration selected for the target serving cell in accordance with an SR configuration corresponding to the first resource; the third SR configuration is an SR configuration selected for the target BWP in accordance with the SR configuration corresponding to the first resource.

Optionally, that the SR fails to be transmitted at the first resource includes: the SR fails to be transmitted at the first resource due to a listen before talk (LBT) failure; or the SR fails to be transmitted at the first resource due to a collision between the first resource and other resources; or the SR fails to be transmitted at the first resource because there is other data with a higher priority than the SR in a physical layer multiplexing process.

Optionally, the switching to the second resource in the case that the SR fails to be transmitted at the first resource includes: triggering the SR and starting a timer; and switching to the second resource in a case that the timer expires and the SR fails to be transmitted at the first resource.

Optionally, the method further includes: performing counting by using a counter, wherein each time the terminal performs resource switching for the SR, the counter is incremented by 1, and the counter is initialized to 0 after the SR is triggered; and triggering a random access procedure or a radio link failure (RLF) procedure when a count value of the counter reaches a threshold.

Optionally, the switching to the first SR configuration includes: switching from a current SR configuration to the first SR configuration, wherein the current SR configuration and the first SR configuration belong to a same serving cell or a same BWP.

The present disclosure further provides in some embodiments a terminal, including: a switching module, configured to switch to a second resource in a case that an SR fails to be transmitted at a first resource; and a transmission module, configured to transmit the SR at the second resource.

Optionally, the second resource includes: a target serving cell or a target BWP or a first SR configuration.

Optionally, the switching to the second resource in the case that the SR fails to be transmitted at the first resource includes: triggering the SR and starting a timer; and switching to the second resource in a case that the timer expires and the SR fails to be transmitted at the first resource.

The present disclosure further provides in some embodiments a terminal, including: a transceiver, a memory, a processor, and a program stored in the memory and configured to be executed by the processor. The transceiver or the processor is configured to switch to a second resource in a case that an SR fails to be transmitted at a first resource; and the transceiver is configured to transmit the SR at the second resource.

Optionally, the second resource includes: a target serving cell or a target BWP or a first SR configuration.

Optionally, that the SR fails to be transmitted at the first resource includes: the SR fails to be transmitted at the first resource due to an LBT failure; or the SR fails to be transmitted at the first resource due to a collision between the first resource and other resources; or the SR fails to be transmitted at the first resource because there is other data with a higher priority than the SR in a physical layer multiplexing process.

Optionally, the switching to the second resource in the case that the SR fails to be transmitted at the first resource includes: triggering the SR and starting a timer; and switching to the second resource in a case that the timer expires and the SR fails to be transmitted at the first resource.

Optionally, the transceiver or the processor is further configured to: perform counting by using a counter, wherein each time the terminal performs resource switching for the SR, the counter is incremented by 1, and the counter is initialized to 0 after the SR is triggered; and trigger a random access procedure or a radio link failure (RLF) procedure when a count value of the counter reaches a threshold.

The present disclosure further provides in some embodiments a computer-readable storage medium storing therein a computer program. The computer program is configured to be executed by a processor to implement steps of the above-mentioned method.

According to the embodiments of the present disclosure, through switching to a second resource in a case that an SR fails to be transmitted at a first resource; and transmitting the SR at the second resource, it is able to switch to the second resource to transmit the SR, so as to avoid waiting for a long time, thereby to reduce latency for the terminal in requesting uplink resources.

DETAILED DESCRIPTION

In order to make the objects, the technical solutions and the advantages of the present disclosure more apparent, the present disclosure will be described hereinafter in a clear and complete manner in conjunction with the drawings and embodiments.

Figure 1:
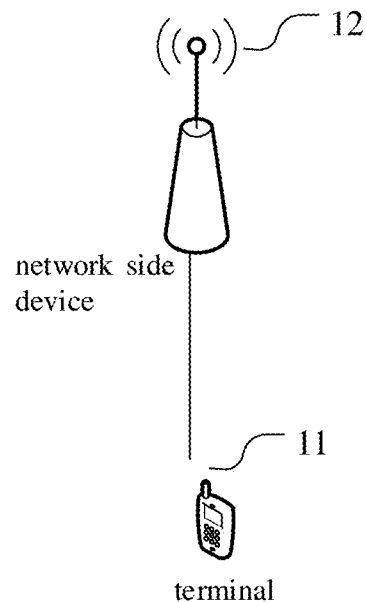
FIG. 1 is a schematic view showing a network architecture to which some embodiments of the present disclosure are applicable.

FIG. 1 is a schematic view showing a network architecture to which some embodiments of the present disclosure are applicable. As shown in FIG. 1, the network architecture includes a terminal 11 and a network side device 12. The terminal 11 may be user equipment (UE) or any other terminal device, e.g., mobile phone, tablet personal computer, laptop computer, personal digital assistant (PDA), mobile Internet device (MID), wearable device, robot, vehicle or other terminal side devices. It should be appreciated that, a specific type of the terminal will not be particularly limited herein. The network side device 12 may be an access network device, such as a base station, e.g., macro base station, Long Term Evolution (LTE) evolved Node B (eNB), or $5^{th}$-Generation (5G) New Radio (NR) NB. The network side device may also be a micro base station, e.g., low power node (LPN), pico base station, femto base station, or access point (AP). The network side device may also be a central unit (CU), or a core network device, e.g., a mobility management entity (MME), access management function (AMF), session management function (SMF), user plane function (UPF), serving gateway (SGW), packet data network gateway (PDN GateWay), policy control function (PCF), policy and charging rules function (PCRF), serving general packet radio service (GPRS) support node (SGSN). It should be appreciated that, a specific type of the network side device will not be particularly limited in embodiments of the present disclosure.

Figure 2:
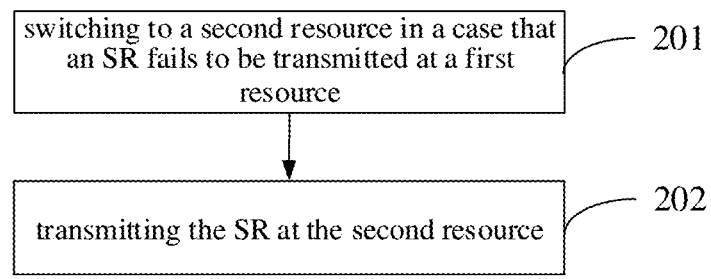
FIG. 2 is a flow chart of an SR transmitting method according to an embodiment of the present disclosure.

FIG. 2 is a flow chart showing an SR transmitting method according to an embodiment of the present disclosure. As shown in FIG. 2, the method includes: a step 201: switching to a second resource in a case that an SR fails to be transmitted at a first resource; and a step 202: transmitting the SR at the second resource.

That the SR fails to be transmitted at the first resource may be that the SR fails to be transmitted at the first resource since there is data being transmitted at the first resource that has a higher priority than the SR, a channel on the first resource is busy, or the like. The first resource may be a resource for transmitting the SR, such as a resource corresponding to an SR configuration. Further, the first resource may be a dedicated physical uplink control channel (PUCCH) resource configured by the network, or an uplink resource obtained through a random access procedure, and the first resource may be a time resource, a frequency domain resource, or a spatial domain resource.

The second resource may be a resource belonging to a different serving cell than the serving cell of the first resource, or a resource belonging to a different BWP than the BWP of the first resource, or a resource belonging to a different SR configuration than the SR configuration of the first resource. In addition, the second resource may be configured by the network side; however, the present disclosure is not limited thereto, e.g., the second resource may be selected by the terminal itself or specified in a protocol.

In the embodiments of the present disclosure, through the above steps, it is able to switch to the second resource to transmit the SR in the case that the SR fails to be transmitted at the first resource, so as to reduce the latency for the terminal in requesting uplink resources.

As an optional implementation, the second resource includes: a target serving cell or a target BWP or a first SR configuration.

The target serving cell may include: a serving cell pre-configured by a network side, a serving cell selected by the terminal in accordance with a measurement result, a serving cell dynamically indicated by the network side, a serving cell in licensed spectrum, an SpCell initially accessed by the terminal when entering a connected state, or an SpCell initially accessed by the terminal when adding a secondary network node, wherein if the target serving cell is the SpCell, the terminal switches from a secondary cell (SCell) to the SpCell.

The serving cell selected by the terminal in accordance with the measurement result may be a serving cell selected by the terminal in accordance with the measurement result that has a good channel quality, e.g., a serving cell with the highest reference signal received power (RSRP).

The SpCell initially accessed by the terminal when entering the connected state may refer to: if a current serving cell of the terminal is an SCell, and the terminal switches to an SpCell, then the SpCell is the serving cell initially accessed by the terminal when entering the connected state; and the SpCell initially accessed by the terminal when adding the secondary network node may refer to: if a current serving cell of the terminal is an SCell, and then the terminal switches to an SpCell, then the SpCell is the serving cell initially accessed by the terminal when adding the secondary network node (SeNB).

The target BWP may include: a BWP pre-configured by a network side, a BWP selected by the terminal in accordance with a measurement result, a BWP dynamically indicated by the network side, a BWP in licensed spectrum, an initial BWP, or a default BWP.

The BWP selected by the terminal in accordance with the measurement result may be a BWP selected by the terminal in accordance with the measurement result that has a good channel quality, e.g., a BWP with the highest RSRP.

The first SR configuration may include: an SR configuration pre-configured by a network side, or an SR configuration dynamically indicated by the network side.

Further, the first SR configuration may include an SR transmission resource, e.g., an SR period, a PUCCH resource and the like. In addition, the first SR configuration may be configured by SR configuration information, and the SR configuration information may further include a mapping between an SR configuration and a logical channel.

Optionally, the transmitting the SR at the second resource includes: transmitting the SR in the target serving cell according to a second SR configuration; or, transmitting the SR in the target BWP according to a third SR configuration.

The second SR configuration of the target serving cell may be an SR configuration selected for the target serving cell in accordance with an SR configuration corresponding to the first resource; and the third SR configuration of the target BWP may be an SR configuration selected for the target BWP in accordance with the SR configuration corresponding to the first resource. In this way, the terminal may switch between cells or BWPs without configuring SR configurations in the cells or the BWPs, so as to save power of the terminal, and reduce the complexity of cell or BWP configuration. Of course, the present disclosure is not limited thereto, for example, the second SR configuration of the target serving cell may be an SR configuration pre-configured for the target serving cell, and the third SR configuration of the target BWP may be an SR configuration pre-configured for the target BWP.

As an optional implementation, the switching to the first SR configuration includes: switching from a current SR configuration to the first SR configuration, wherein the current SR configuration and the first SR configuration belong to a same serving cell or a same BWP.

In this implementation, a plurality of SR configurations may be configured for a same BWP or a same serving cell.

In this implementation, when the SR fails to be transmitted, it is able to switch between SR configurations in a same serving cell or a same BWP, without switching to a specific BWP or serving cell, so as to reduce the power consumption of the terminal.

As an optional implementation, that the SR fails to be transmitted at the first resource includes: the SR fails to be transmitted at the first resource due to an LBT failure; or the SR fails to be transmitted at the first resource due to a collision between the first resource and other resources; or the SR fails to be transmitted at the first resource because there is other data with a higher priority than the SR in a physical layer multiplexing process.

That there is other data with a higher priority than the SR in the physical layer multiplexing process may refer to that, when the terminal performs multiplexing at the first resource, the priority of other data, e.g., channel state information (CSI) or hybrid automatic repeat request (HARQ) feedback, is higher than that of the SR.

As an optional implementation, the switching to the second resource in the case that the SR fails to be transmitted at the first resource includes: triggering the SR and starting a timer; and switching to the second resource in a case that the timer expires and the SR fails to be transmitted at the first resource.

The triggering the SR may refer to: the SR is triggered by a logical channel, e.g., the SR is triggered after data of the logical channel arrives.

In this implementation, it is able to start the timer after the SR is triggered, and switch to the second resource if the timer expires and the SR fails to be transmitted at the first resource, thereby reducing the latency for the terminal in requesting uplink resources.

In addition, a duration of the timer may be configured by the network side or specified in a protocol.

As an optional implementation, the method further includes: performing counting by using a counter, wherein each time the terminal performs resource switching for the SR, the counter is incremented by 1, and the counter is initialized to 0 after the SR is triggered; and triggering a random access procedure or an RLF procedure when a count value of the counter reaches a threshold.

That each time the terminal performs resource switching may refer to: each time a switch between serving cells, a switch between BWPs or a switch between SR configurations is performed, and contents of different switches may be the same or different, e.g., the first switch is a switch between SR configurations, the second switch is a switch between BWPs, and the third switch is a switch between serving cells.

In addition, that the counter is initialized to 0 after the SR is triggered may refer to: when the SR is triggered, the counter is initialized to 0. The threshold may be configured by the network side, specified in a protocol, or set by the terminal.

In addition, the triggering the random access procedure or the RLF procedure in the case that the count value of the counter reaches the threshold may refer to: if the count value of the counter reaches the threshold and the SR fails to be transmitted, the random access procedure or the RLF procedure is triggered.

In this implementation, when the count value of the counter reaches the threshold, the random access procedure or the RLF procedure is triggered, therefore the random access procedure or the RLF procedure may be performed in time, thereby transmitting the SR in time.

According to the embodiments of the present disclosure, through switching to a second resource in a case that an SR fails to be transmitted at a first resource and transmitting the SR at the second resource, it is able to switch to the second resource to transmit the SR, so as to avoid waiting for a long time, thereby to reduce latency for the terminal in requesting uplink resources.

A plurality of examples of the SR transmitting method in the embodiments of the present disclosure will be described hereinafter.

First Embodiment

In this embodiment, the terminal's BWP switching when the SR fails to be transmitted will be described hereinafter exemplarily, which includes the following steps 1 to 4.

Step 1: the terminal receives first configuration information transmitted by the network side.

The first configuration information may include SR configuration information and BWP configuration information. The SR configuration information includes an SR configuration and a mapping between the SR configuration and a logical channel, where the SR configuration includes an SR transmission resource, e.g., an SR period, a PUCCH resource, etc.; and the BWP configuration information includes frequency band information about the BWP, and the like. The SR configuration may be the SR configuration in the embodiment shown in FIG. 2.

Step 2: a first SR is triggered after data of a first logical channel arrives.

Step 3: the terminal delivers the first SR to a physical layer.

When the terminal determines that the SR resource corresponding to the first SR meets a transmission condition, the terminal delivers the first SR to the physical layer, where the transmission condition may be: the SR resource does not overlap other physical uplink shared channel (PUSCH) resources; or the SR resource overlaps other PUSCH resources, but the priority of the SR is higher than that of the PUSCH.

Step 4: the terminal performs BWP switching and transmits the first SR.

Optionally, the Step 4 may refer to: if the first SR fails to be transmitted at the SR resource since an LBT failure indication delivered by the physical layer is received when the terminal delivers the first SR to the physical layer, or there is other data with a higher priority than the first SR in the physical layer multiplexing process, or the SR resource collides with other resources, then the terminal performs BWP switching and transmits the first SR.

Optionally, assuming that a BWP in which the terminal currently operates is BWP1, and the terminal will switch to a target BWP, the target BWP may be: a BWP pre-configured through a radio resource control (RRC) signaling by the network side; or a BWP selected by the terminal in accordance with the measurement result that has a good channel quality, e.g., a BWP with the highest RSRP; or a BWP dynamically indicated by the network side through medium access control (MAC) control element (CE) or physical layer downlink control information (DCI); or a BWP in licensed spectrum.

Optionally, a BWP switch counter (BWP_SWITCH_COUNTER) is incremented by 1, where the BWP_SWITCH_COUNTER is initialized to 0 when the first SR is triggered, and the BWP_SWITCH_COUNTER is configured for each SR configuration.

When a value of the BWP_SWITCH_COUNTER is greater than or equal to a threshold (e.g., MAX_BWP_SWITCH), the terminal triggers the random access procedure, or the terminal triggers the RLF procedure.

Optionally, when transmitting/delivering the first SR, the terminal starts a first timer which is set to a first timer value, and when the first timer expires, if the first SR fails to be transmitted at the SR resource due to the LBT failure, or due to the collision between the SR resource and other resources, or since there is other data with a higher priority than the first SR in the physical layer multiplexing process, the terminal performs the BWP switching operation. The first timer value is configured by the RRC.

Optionally, user equipment selects the SR configuration for the target BWP, to implement the transmission of the first SR.

It should be appreciated that, this embodiment only illustrates the technical solution of BWP switching in the embodiment shown in FIG. 2, and does not impose any limitation on the technical solution of BWP switching in the embodiment shown in FIG. 2.

Second Embodiment

In this embodiment, the terminal's serving cell switching when the SR fails to be transmitted will be described hereinafter exemplarily, which includes the following steps 1 to 4.

Step 1: the terminal receives the second configuration information transmitted by the network side.

The second configuration information may include SR configuration information and serving cell configuration information. The SR configuration information includes an SR configuration and a mapping between the SR configuration and a logical channel, where the SR configuration includes an SR transmission resource, e.g., an SR period, a PUCCH resource, etc.; and the serving cell configuration information includes frequency band information about the serving cell, and the like.

Step 2: a second SR is triggered after data of a second logical channel arrives.

Step 3: the terminal delivers the second SR to a physical layer.

When the terminal determines that the SR resource corresponding to the second SR meets a transmission condition, the terminal delivers the second SR to the physical layer, where the transmission condition may be: the SR resource does not overlap other PUSCH resources; or the SR resource overlaps other PUSCH resources, but the priority of the SR is higher than that of the PUSCH.

Step 4: the terminal performs serving cell switching and transmits the second SR.

Optionally, the Step 4 may refer to: if the second SR fails to be transmitted at the SR resource since an LBT failure indication delivered by the physical layer is received when the terminal delivers the second SR to the physical layer, or there is other data with a higher priority than the second SR in the physical layer multiplexing process, or the SR resource collides with other resources, then the terminal performs serving cell switching and transmits the second SR.

Optionally, assuming that a serving cell in which the terminal currently operates is serving cell 1, and the terminal will switch to a target serving cell, the target serving cell may be: a serving cell pre-configured through an RRC signaling by the network side; or a serving cell selected by the terminal in accordance with the measurement result that has a good channel quality, e.g., a serving cell with the highest RSRP; or a serving cell dynamically indicated by the network side through medium access control (MAC) control element (CE) or physical layer downlink control information (DCI); or a serving cell in licensed spectrum; or if a current serving cell is an SCell, and the terminal switches to an SpCell, then the SpCell is the serving cell initially accessed by the terminal when entering the connected state or adding SeNB.

Optionally, a cell switch counter (CELL_SWITCH_COUNTER) is incremented by 1, where the CELL_SWITCH_COUNTER is initialized to 0 when the second SR is triggered, and the CELL_SWITCH_COUNTER is configured for each SR configuration.

When a value of the CELL_SWITCH_COUNTER is greater than or equal to a threshold (e.g., MAX_CELL_SWITCH), the terminal triggers the random access procedure, or the terminal triggers the RLF procedure.

Optionally, when transmitting/delivering the second SR, the terminal starts a first timer which is set to a first timer value, and when the first timer expires, if the second SR fails to be transmitted at the SR resource due to the LBT failure, or due to the collision between the SR resource and other resources, or since there is other data with a higher priority than the second SR in the physical layer multiplexing process, the terminal performs the serving cell switching operation. The first timer value is configured by the RRC.

It should be appreciated that, this embodiment only illustrates the technical solution of serving cell switching in the embodiment shown in FIG. 2, and does not impose any limitation on the technical solution of serving cell switching in the embodiment shown in FIG. 2.

Third Embodiment

In this embodiment, the terminal's SR configuration switching when the SR fails to be transmitted will be described hereinafter exemplarily, which includes the following steps 1 to 4.

Step 1: the terminal receives the third configuration information transmitted by the network side.

The third configuration information includes SR configuration information. The SR configuration information includes an SR configuration and a mapping between the SR configuration and a logical channel, where the SR configuration includes an SR transmission resource, e.g., an SR period, a PUCCH resource, etc.

Step 2: a third SR is triggered after data of a third logical channel arrives.

Step 3: the terminal delivers the third SR to a physical layer.

When the terminal determines that the SR resource corresponding to the third SR meets a transmission condition, the terminal delivers the third SR to the physical layer, where the transmission condition may be: the SR resource does not overlap other PUSCH resources; or the SR resource overlaps other PUSCH resources, but the priority of the SR is higher than that of the PUSCH.

Step 4: the terminal performs SR configuration switching and transmits the third SR.

Optionally, if the third SR fails to be transmitted at the SR resource since an LBT failure indication delivered by the physical layer is received when the terminal delivers the third SR to the physical layer, or the SR resource collides with other resources, or there is other data with a higher priority than the third SR in the physical layer multiplexing process, then the terminal performs SR configuration switching and transmits the third SR.

Optionally, the terminal switches to a resource of a target SR configuration, the target SR configuration may be: an SR configuration pre-configured or dynamically indicated.

Optionally, an SR configuration switch counter (SR_SWITCH_COUNTER) is incremented by 1, where the SR_SWITCH_COUNTER is initialized to 0 when the third SR is triggered, and the SR_SWITCH_COUNTER is configured for each SR configuration.

When a value of the SR_SWITCH_COUNTER is greater than or equal to a threshold (e.g., MAX_SR_SWITCH), the terminal triggers the random access procedure, or the terminal triggers the RLF procedure.

Optionally, when transmitting/delivering the third SR, the terminal starts a first timer which is set to a first timer value, and when the first timer expires, if the third SR fails to be transmitted at the SR resource due to the LBT failure, or since there is other data with a higher priority than the third SR in the physical layer multiplexing process, or due to the collision between the SR resource and other resources, the terminal performs the SR configuration switching operation. The first timer value is configured by the RRC.

In this embodiment, since the SR configuration may configure the same parameters, e.g., period, PUCCH resources and the like, for different serving cells or different BWPs, the terminal can directly switch to a corresponding SR configuration, without switching to a specific BWP or serving cell and then selecting an SR configuration (because each BWP or serving cell may be configured with a plurality of SR configurations as well).

It should be appreciated that, this embodiment only illustrates the technical solution of SR configuration switching in the embodiment shown in FIG. 2, and does not impose any limitation on the technical solution of SR configuration switching in the embodiment shown in FIG. 2.

According to the embodiments of the present disclosure, it is able to switch the BWP/serving cell/SR configuration to transmit SR when the SR fails to be transmitted, so as to enable the terminal to timely select the SR resource and perform an uplink resource request process after an LBT failure occurs, thereby reducing latency in uplink data transmission.

Figure 3:
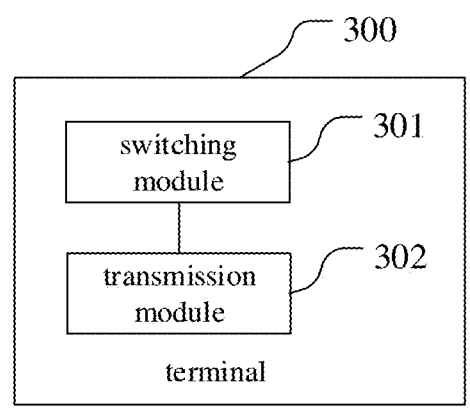
FIG. 3 is a schematic structural view showing a terminal according to an embodiment of the present disclosure.

FIG. 3 is a schematic structural view showing a terminal according to an embodiment of the present disclosure. As shown in FIG. 3, the terminal 300 includes: a switching module 301, configured to switch to a second resource in a case that an SR fails to be transmitted at a first resource; and a transmission module 302, configured to transmit the SR at the second resource.

Optionally, the second resource includes: a target serving cell or a target BWP or a first SR configuration.

Optionally, the target serving cell includes any one of: a serving cell pre-configured by a network side, a serving cell selected by the terminal in accordance with a measurement result, a serving cell dynamically indicated by the network side, a serving cell in licensed spectrum, an SpCell initially accessed by the terminal when entering a connected state, or an SpCell initially accessed by the terminal when adding a secondary network node; wherein the terminal switches from an SCell to the SpCell in a case that the target serving cell is the SpCell.

Optionally, the target BWP includes any one of: a BWP pre-configured by a network side, a BWP selected by the terminal in accordance with a measurement result, a BWP dynamically indicated by the network side, a BWP in licensed spectrum, an initial BWP, or a default BWP.

Optionally, the first SR configuration includes: an SR configuration pre-configured by a network side or an SR configuration dynamically indicated by the network side.

Optionally, the transmitting the SR at the second resource includes: transmitting the SR in the target serving cell according to a second SR configuration; or transmitting the SR in the target BWP according to a third SR configuration.

Optionally, the second SR configuration is an SR configuration selected for the target serving cell in accordance with an SR configuration corresponding to the first resource; the third SR configuration is an SR configuration selected for the target BWP in accordance with the SR configuration corresponding to the first resource.

Optionally, that the SR fails to be transmitted at the first resource includes: the SR fails to be transmitted at the first resource due to an LBT failure; or the SR fails to be transmitted at the first resource due to a collision between the first resource and other resources; or the SR fails to be transmitted at the first resource because there is other data with a higher priority than the SR in a physical layer multiplexing process.

Optionally, the switching to the second resource in the case that the SR fails to be transmitted at the first resource includes: triggering the SR and starting a timer; and switching to the second resource in a case that the timer expires and the SR fails to be transmitted at the first resource.

Figure 4:
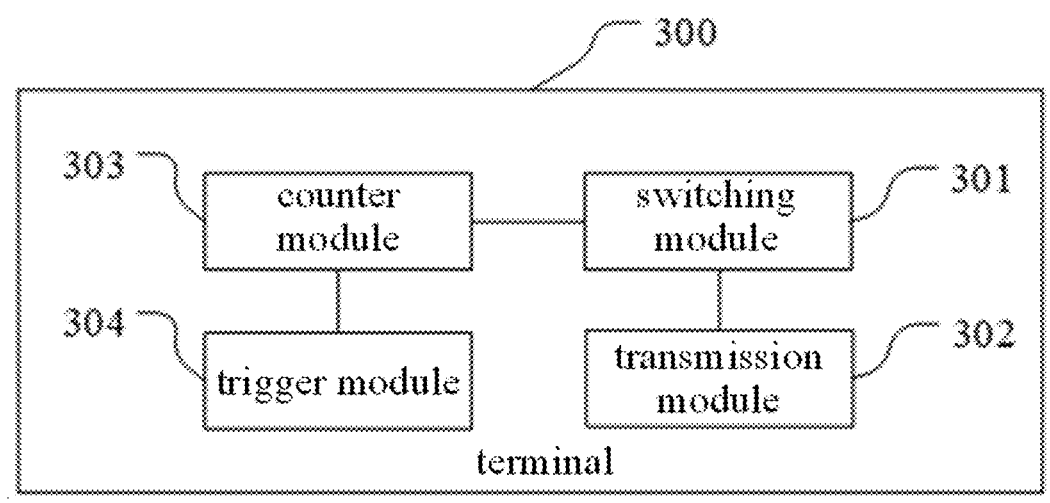
FIG. 4 is another schematic structural view showing a terminal according to an embodiment of the present disclosure.

Optionally, as shown in FIG. 4, the terminal further includes: a counter module 303, configured to perform counting by using a counter, wherein each time the terminal performs resource switching for the SR, the counter is incremented by 1, and the counter is initialized to 0 after the SR is triggered; and a trigger module 304, configured to trigger a random access procedure or an RLF procedure when a count value of the counter reaches a threshold.

Optionally, the switching to the first SR configuration includes: switching from a current SR configuration to the first SR configuration, and the current SR configuration and the first SR configuration belong to a same serving cell or a same BWP.

It should be appreciated that, the terminal 300 may be that mentioned in the above method embodiments, and the terminal 300 may implement any implementation of the terminal in the method embodiments mentioned above with a same beneficial effect, which will thus not be particularly defined herein.

Figure 5:
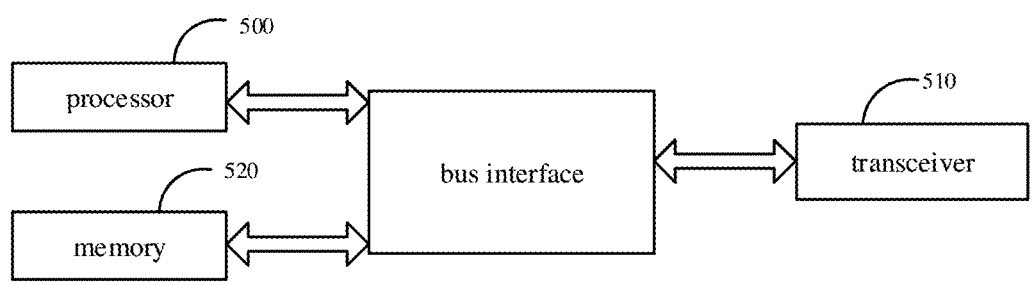
FIG. 5 is yet another schematic structural view showing a terminal according to an embodiment of the present disclosure.

FIG. 5 is yet another schematic structural view showing a terminal according to an embodiment of the present disclosure. As shown in FIG. 5, the terminal includes: a transceiver 510, a memory 520, a processor 500, and a program stored in the memory 520 and configured to be executed by the processor 500. The transceiver 510 or the processor 500 is configured to switch to a second resource in a case that an SR fails to be transmitted at a first resource; and the transceiver 510 is configured to transmit the SR at the second resource.

The transceiver 510 may receive and transmit data under control of the processor 500.

In FIG. 5, a bus architecture may include any number of interconnected buses and bridges. Specifically, the bus architecture connects various circuits such as one or more processors represented by the processor 500, and memories represented by the memory 520. Other various circuits such as peripheral devices, voltage regulators, and power management circuits may also be connected by the bus architecture, which are well known in the art and thus will not be particularly defined herein. An interface is provided by a bus interface. The transceiver 510 may be a plurality of elements, including a transmitter and a receiver, and provides a unit for communicating with other devices on a transmission medium.

The processor 500 is responsible for managing the bus architecture as well as general processing. The memory 520 may store therein data for the operation of the processor 500.

It should be appreciated that, the memory 520 is not limited to residing on the terminal, and the memory 520 and the processor 500 may be located at different geographical positions.

Optionally, the second resource includes: a target serving cell or a target BWP or a first SR configuration.

Optionally, the target serving cell includes any one of: a serving cell pre-configured by a network side, a serving cell selected by the terminal in accordance with a measurement result, a serving cell dynamically indicated by the network side, a serving cell in licensed spectrum, an SpCell initially accessed by the terminal when entering a connected state, or an SpCell initially accessed by the terminal when adding a secondary network node; wherein the terminal switches from an SCell to the SpCell in a case that the target serving cell is the SpCell.

Optionally, the target BWP includes any one of: a BWP pre-configured by a network side, a BWP selected by the terminal in accordance with a measurement result, a BWP dynamically indicated by the network side, a BWP in licensed spectrum, an initial BWP, or a default BWP.

Optionally, the first SR configuration includes: an SR configuration pre-configured by a network side or an SR configuration dynamically indicated by the network side.

Optionally, the transmitting the SR at the second resource includes: transmitting the SR in the target serving cell according to a second SR configuration; or transmitting the SR in the target BWP according to a third SR configuration.

Optionally, the second SR configuration is an SR configuration selected for the target serving cell in accordance with an SR configuration corresponding to the first resource; the third SR configuration is an SR configuration selected for the target BWP in accordance with the SR configuration corresponding to the first resource.

Optionally, that the SR fails to be transmitted at the first resource includes: the SR fails to be transmitted at the first resource due to an LBT failure; or the SR fails to be transmitted at the first resource due to a collision between the first resource and other resources; or the SR fails to be transmitted at the first resource because there is other data with a higher priority than the SR in a physical layer multiplexing process.

Optionally, the switching to the second resource in the case that the SR fails to be transmitted at the first resource includes: triggering the SR and starting a timer; and switching to the second resource in a case that the timer expires and the SR fails to be transmitted at the first resource.

Optionally, the transceiver 510 or the processor 500 is further configured to: perform counting by using a counter, wherein each time the terminal performs resource switching for the SR, the counter is incremented by 1, and the counter is initialized to 0 after the SR is triggered; and trigger a random access procedure or an RLF procedure when a count value of the counter reaches a threshold.

Optionally, the switching to the first SR configuration includes: switching from a current SR configuration to the first SR configuration, wherein the current SR configuration and the first SR configuration belong to a same serving cell or a same BWP.

It should be appreciated that, the terminal may be that mentioned in the above method embodiments, and the terminal may implement any implementation of the terminal in the method embodiments mentioned above with a same beneficial effect, which will thus not be particularly defined herein.

The present disclosure further provides in some embodiments a computer-readable storage medium storing therein a computer program. The computer program is configured to be executed by a processor to implement steps of the above-mentioned SR transmitting method.

In the several embodiments provided in this application, it should be understood that the disclosed method and device may be implemented in other manners. For example, the described device embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the devices or units may be implemented in electrical, mechanical, or other forms.

In addition, various functional units in the embodiments of the present disclosure may be integrated into one processing unit, or each of the units may exist alone physically. Alternatively, two or more functional units may be integrated into one unit. The above integrated unit may be implemented in form of hardware, or may be implemented in form of a combination of hardware and software functional unit.

The integrated units implemented in form of software functional unit may be stored in a computer-readable storage medium. The software functional unit is stored in a storage medium, and includes several instructions for instructing a computer device (which may be a personal computer, a server, or a network device) to perform a part of the steps of the scheduling request transmitting method described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The above modules may be one or more ICs capable of implementing the above-mentioned method, e.g., one or more application specific integrated circuits (ASICs), one or more digital signal processors (DSPs), one or more field programmable gate arrays (FPGAs), or the like. For another example, when a certain module is implemented in the form of a program code called by a processing element, the processing element may be a general-purpose processor, e.g., a central processing unit (CPU) or any other processor capable of calling the program code. These modules may be integrated together and implemented in the form of system-on-a-chip (SOC).

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. A scheduling request (SR) transmitting method, performed by a terminal, comprising:
    switching to a second resource in a case that an SR fails to be transmitted at a first resource; and
    transmitting the SR at the second resource;
    wherein that the SR fails to be transmitted at the first resource comprises:
        the SR fails to be transmitted at the first resource because there is other data with a higher priority than the SR in a physical layer multiplexing process;
    wherein the switching to the second resource in the case that the SR fails to be transmitted at the first resource comprises:
        triggering the SR and starting a timer; and
        switching to the second resource in a case that the timer expires and the SR fails to be transmitted at the first resource.

2. The SR transmitting method according to claim 1, wherein the second resource comprises: a target serving cell or a target bandwidth part (BWP) or a first SR configuration.

3. The SR transmitting method according to claim 2, wherein the target serving cell comprises any one of:
    a serving cell pre-configured by a network side, a serving cell selected by the terminal in accordance with a measurement result, a serving cell dynamically indicated by the network side, a serving cell in licensed spectrum, a special cell (SpCell) initially accessed by the terminal when entering a connected state, or an SpCell initially accessed by the terminal when adding a secondary network node;
    wherein in a case that the target serving cell is the SpCell, the terminal switches from a secondary cell (SCell) to the SpCell.

4. The SR transmitting method according to claim 2, wherein the target BWP comprises any one of:
    a BWP pre-configured by a network side, a BWP selected by the terminal in accordance with a measurement result, a BWP dynamically indicated by the network side, a BWP in licensed spectrum, an initial BWP or a default BWP.

5. The SR transmitting method according to claim 2, wherein the first SR configuration comprises: an SR configuration pre-configured by a network side or an SR configuration dynamically indicated by the network side.

6. The SR transmitting method according to claim 2, wherein the transmitting the SR at the second resource comprises:
    transmitting the SR in the target serving cell according to a second SR configuration; or
    transmitting the SR in the target BWP according to a third SR configuration.

7. The SR transmitting method according to claim 6, wherein the second SR configuration is an SR configuration selected for the target serving cell in accordance with an SR configuration corresponding to the first resource;
    the third SR configuration is an SR configuration selected for the target BWP in accordance with the SR configuration corresponding to the first resource.

8. The SR transmitting method according to claim 2, wherein the switching to the first SR configuration comprises:
    switching from a current SR configuration to the first SR configuration, wherein the current SR configuration and the first SR configuration belong to a same serving cell or a same BWP.

9. The SR transmitting method according to claim 1, further comprising:
    performing counting by using a counter, wherein each time the terminal performs resource switching for the SR, the counter is incremented by 1, and the counter is initialized to 0 after the SR is triggered; and
    triggering a random access procedure or a radio link failure (RLF) procedure when a count value of the counter reaches a threshold.

10. A non-transitory computer-readable storage medium storing therein a computer program, wherein the computer program is configured to be executed by a processor to implement steps in the method according to claim 1.

11. A terminal, comprising: a transceiver, a memory, a processor, and a program stored in the memory and configured to be executed by the processor, wherein
    the transceiver or the processor is configured to switch to a second resource in a case that an SR fails to be transmitted at a first resource; and
    the transceiver is configured to transmit the SR at the second resource;

wherein that the SR fails to be transmitted at the first resource comprises:

the SR fails to be transmitted at the first resource because there is other data with a higher priority than the SR in a physical layer multiplexing process;

wherein the switching to the second resource in the case that the SR fails to be transmitted at the first resource comprises:

triggering the SR and starting a timer; and switching to the second resource in a case that the timer expires and the SR fails to be transmitted at the first resource.

12. The terminal according to claim 11, wherein the second resource comprises: a target serving cell or a target BWP or a first SR configuration.

13. The terminal according to claim 12, wherein the target serving cell comprises any one of:

a serving cell pre-configured by a network side, a serving cell selected by the terminal in accordance with a measurement result, a serving cell dynamically indicated by the network side, a serving cell in licensed spectrum, a special cell (SpCell) initially accessed by the terminal when entering a connected state, or an SpCell initially accessed by the terminal when adding a secondary network node;

wherein in a case that the target serving cell is the SpCell, the terminal switches from a secondary cell (SCell) to the SpCell;

or wherein the target BWP comprises any one of:

a BWP pre-configured by a network side, a BWP selected by the terminal in accordance with a measurement result, a BWP dynamically indicated by the network side, a BWP in licensed spectrum, an initial BWP or a default BWP;

or, wherein the first SR configuration comprises: an SR configuration pre-configured by a network side or an SR configuration dynamically indicated by the network side.

14. The terminal according to claim 12, wherein the transmitting the SR at the second resource comprises:

transmitting the SR in the target serving cell according to a second SR configuration; or transmitting the SR in the target BWP according to a third SR configuration.

15. The terminal according to claim 12, wherein the switching to the first SR configuration comprises:

switching from a current SR configuration to the first SR configuration, wherein the current SR configuration and the first SR configuration belong to a same serving cell or a same BWP.

16. The terminal according to claim 11, wherein the transceiver or the processor is further configured to:

perform counting by using a counter, wherein each time the terminal performs resource switching for the SR, the counter is incremented by 1, and the counter is initialized to 0 after the SR is triggered; and trigger a random access procedure or an RLF procedure when a count value of the counter reaches a threshold.

* * * * *